United States Patent
Kim

(10) Patent No.: US 9,021,911 B2
(45) Date of Patent: May 5, 2015

(54) ATTACHABLE ELECTRONIC SHIFT LEVER

(71) Applicant: Hyundai Motor Company, Seoul (KR)

(72) Inventor: Eun-Sik Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 107 days.

(21) Appl. No.: 13/873,564

(22) Filed: Apr. 30, 2013

(65) Prior Publication Data

US 2014/0130630 A1 May 15, 2014

(30) Foreign Application Priority Data

Nov. 9, 2012 (KR) ........................ 10-2012-0126390

(51) Int. Cl.
  *B60K 17/04* (2006.01)
  *B60K 17/12* (2006.01)
  *F16H 59/10* (2006.01)

(52) U.S. Cl.
  CPC .................... *F16H 59/105* (2013.01)

(58) Field of Classification Search
  CPC .......... F16H 9/10; F16H 59/105; F16H 59/12
  USPC ................. 74/473.1, 473.12, 473.24, 473.25, 74/473.3; 701/2, 51, 53, 58; 37/196; 307/9.1, 10.1, 10.4, 10.3; 455/90.1–90.3, 41.2, 41.3, 575.9, 572, 455/573, 574
  See application file for complete search history.

(56) References Cited

U.S. PATENT DOCUMENTS

| | | | | |
|---|---|---|---|---|
| 4,884,057 | A * | 11/1989 | Leorat ........................... | 340/456 |
| 5,085,106 | A * | 2/1992 | Bubnash ......................... | 74/335 |
| 5,138,245 | A * | 8/1992 | Mattinger et al. ............. | 320/115 |
| 5,361,519 | A * | 11/1994 | Ciula et al. ...................... | 37/234 |
| 5,600,225 | A * | 2/1997 | Goto .............................. | 320/108 |
| 5,884,528 | A * | 3/1999 | Ludanek et al. ............... | 74/473.3 |
| 6,151,977 | A * | 11/2000 | Menig et al. .................. | 74/336 R |
| 6,246,127 | B1 * | 6/2001 | Weilbacher et al. ........... | 307/9.1 |
| 6,500,092 | B2 * | 12/2002 | Syamoto ......................... | 477/99 |
| 6,661,114 | B2 * | 12/2003 | Syamoto ....................... | 307/10.1 |
| 7,026,789 | B2 * | 4/2006 | Bozzone et al. .............. | 320/108 |
| 7,681,340 | B2 * | 3/2010 | Treuthardt ...................... | 37/348 |
| 8,120,317 | B2 * | 2/2012 | Sip ................................ | 320/108 |

(Continued)

FOREIGN PATENT DOCUMENTS

| | | |
|---|---|---|
| JP | 07-015461 U | 1/1995 |
| JP | 199515462 | 3/1995 |

(Continued)

*Primary Examiner* — Justin Krause
*Assistant Examiner* — Alexander Vu
(74) *Attorney, Agent, or Firm* — Mintz Levin Cohn Ferris Glovsky and Popeo, P.C.; Peter F. Corless

(57) ABSTRACT

In one embodiment of the present invention, electronic shift lever including a PRND button and a scroll wheel configured to operate an H-Matic function, which are formed within one region of an upper surface of the shift lever, respectively, in which the shift lever is formed to be attached to and detached from a fixing device which is formed within one region inside a vehicle.

5 Claims, 7 Drawing Sheets

(56) References Cited

U.S. PATENT DOCUMENTS

| | | | |
|---|---|---|---|
| 2002/0152827 A1* | 10/2002 | Hayashi et al. | 74/473.3 |
| 2006/0038786 A1* | 2/2006 | Adan et al. | 345/163 |
| 2007/0137337 A1* | 6/2007 | Kim | 74/335 |
| 2009/0229149 A1* | 9/2009 | Tesinsky | 37/196 |
| 2010/0039063 A1* | 2/2010 | Dowdy et al. | 320/101 |
| 2011/0175567 A1* | 7/2011 | Kidakarn | 320/108 |
| 2011/0219901 A1* | 9/2011 | Giefer et al. | 74/473.3 |
| 2012/0006139 A1* | 1/2012 | Kim | 74/473.3 |
| 2012/0006980 A1 | 1/2012 | Alieu et al. | |
| 2012/0096980 A1* | 4/2012 | Schramm et al. | 74/552 |
| 2012/0271488 A1* | 10/2012 | You | 701/2 |
| 2014/0130630 A1* | 5/2014 | Kim | 74/473.12 |

FOREIGN PATENT DOCUMENTS

| | | |
|---|---|---|
| JP | 2002-248959 A | 9/2002 |
| KR | 10-1998-0062275 | 10/1998 |
| KR | 10-2001-0019534 | 3/2001 |

* cited by examiner

ATTACHABLE ELECTRONIC SHIFT LEVER

CROSS-REFERENCE TO RELATED APPLICATIONS

This application claims priority under 35 U.S.C. §19 to Korean Patent Application No. 10-2012-0126390, filed on Nov. 9, 2012, in the Korean Intellectual Property Office, the disclosure of which is incorporated herein by reference in its entirety.

BACKGROUND OF THE INVENTION

1. Field of the Invention

The present invention relates to an electronic shift lever, which allows a transmission mode operation to be more easily performed and improves visibility for a driver with respect to a transmission mode by providing a shift lever to be attachable to one region of a vehicle.

2. Description of the Related Art

Typically, a transmission apparatus for a vehicle is widely classified into an automatic transmission and a manual transmission. Conventional automatic transmissions use planetary gears and continuously variable transmissions use a continuously variable transmission apparatus.

In the continuously variable transmission (CVT), when a driver selects a P-R-N-D range using a shift lever, a transmission control unit (TCU) controls diameters of a driving pulley and a driven pulley to be changed in accordance with a speed of the vehicle and an amount a throttle is open (a throttle opening angle), and the continuously variable transmission continuously converts input rotating power into output rotating power by the above operation.

Meanwhile, in recent years, as electronic shifting has developed, the vehicle industry has begun to focus on these systems. The electronic shifting system refers to a transmission system which performs an electronic transmission control for a mechanical connection structure of the transmission and the shift lever using an actuator which is electrically operated an electronic shift lever, and an ECU (electronic control unit).

The electronic shifting transmission system detects a change in position of the shift lever using a position sensor, converts a changed position of the shift lever into an electrical signal, and inputs the signal to the TCU (transmission control unit), and therefore a transmission operation is performed by a control of the TCU (transmission control unit).

The electronic shifting transmission system has excellent lever operation force or operational feeling compared to the existing mechanical shift lever system, and has an advantage of being capable of performing a transmission operation by simply operating a push button or a lever.

In recent years, as a shift lever structure for the electronic shifting transmission system, a triptronic or manu-matic transmissions (H-matic) have begun to emerge. However, the recent H-Matic type shift lever system of which a P-R-N-D shift lever protrudes from a console and is also operated in a manner similar to that of the mechanical shift lever of the related art.

That is, the electronic shift lever of the related art also operates in a manner in which the shift lever protrudes to be operated forward and backward, and the H-Matic function is adjusted by using a separate dial lever on the console. However, because the shift lever is fixed, convenience of operation may not be secured, and visibility with respect to an indication of a position of the shift stage is restricted.

In addition, according to the related art, because the space required for the shift lever to protrude is quite large, there is less room for the driver, and a layout of the console becomes more complicated, and a passenger may be injured at the time of a vehicle collision by the protrusion.

SUMMARY OF THE INVENTION

The present invention has been made in an effort to provide an electronic shift lever capable of conveniently operating a transmission mode operation in an adjustable manner, and smoothly performing a transmission operation, by forming the electronic shift lever attachable thereto.

In addition, the present invention provides an electronic shift lever which is more visible to a driver with respect to a transmission mode by fixing the shift lever at a driver selected position, or separating and observing the shift lever.

In addition, the present invention provides an electronic shift lever that improves spatial utilization in the vicinity of a driver seat by freely adjusting a size of the shift lever, and securing safety of a driver at the time of a vehicle collision.

Technical problems of the present invention are not limited to the technical problems described above, and technical problems that are not described will be clearly understood by a person skilled in the art from the description below.

An exemplary embodiment of the present invention provides an electronic shift lever including a PRND button and a scroll wheel configured to operate an H-Matic function, which are formed in one region of an upper surface of the shift lever, respectively, in which the shift lever is formed to be attached to and detached from a fixing device which is formed within one region of an interior of a vehicle.

A lateral side of the shift lever may be formed in a 'C' shape, and the shift lever may be attached to and detached from at least two grooves which are formed at the fixing device.

A charge panel for supplying electric power or a magnet may be formed at each groove of the fixing device. The shift lever may have a charge panel and a steel plate for coupling a magnet which are formed at one region of a lower surface of the shift lever to be spaced apart from each other.

In some exemplary embodiments, the scroll wheel may include a position recognition magnet which is connected to an aperture sensor. The shift lever may also include a wireless communication device configured to determine when the PRND button is pushed and a scroll wheel is rotated and transmit the determination to the TCU (transmission control unit).

The shift lever may also include a charger which is charged by being supplied with external electric power.

According to the exemplary embodiment of the present invention, since the electronic shift lever is attachable and detachable, it is possible to conveniently perform a transmission mode operation at a driver desired position and to operate a button and a scroll wheel by using only one hand like when operating a cellular phone, thereby smoothly performing a transmission operation.

In addition, according to the exemplary embodiment of the present invention, the shift lever may be fixed at a position where a driver desires, or the shift lever may be removed altogether to be analyzed (for repair or inspection), and therefore visibility for the driver with respect to a P-R-N-D mode and an H-Matic mode (+, −) may be improved.

In addition, according to the exemplary embodiment of the present invention, a size of the shift lever may be freely adjusted, and therefore space utilization of a storage space in the vicinity of a driver seat may be improved. Further, various electronic devices may be charged by using a charge panel formed at a shift lever fixing device, and therefore performance of a package may be improved.

In addition, according to the exemplary embodiment of the present invention, because the shift lever is not formed in a protruding shape of the shift lever of the related art, risk of injury of a driver at the time of a vehicle collision may be reduced, and because the shift lever has a simple structure compared to the related art, manufacturing costs may be decreased.

BRIEF DESCRIPTION OF THE DRAWINGS

FIG. 1A is perspective view of upper part of an attachable electronic shift lever, FIG. 1B is perspective view of under part of an attachable electronic shift lever, FIG. 1C is plane view of an attachable electronic shift lever, and FIG. 1D is perspective view showing the charge panel and the magnet on the fixing device.

FIG. 2A is cross-sectional views of the attachable electronic shift lever and FIG. 2B is cross-sectional views of the attachable electronic shift lever on the fixing device.

FIG. 3A is an example view showing that the electronic shift lever is attached to a console of vehicle, FIG. 3B is an example view showing that the driver detaches the electronic shift lever from the fixing device by using the driver's hand, FIG. 3C is an example view showing that the electronic shift lever is attached to upper part of a console of vehicle, and FIG. 3D is an example view showing that the electronic shift lever is attached to a driver seat door.

DETAILED DESCRIPTION OF THE EMBODIMENTS

Figure 1A:
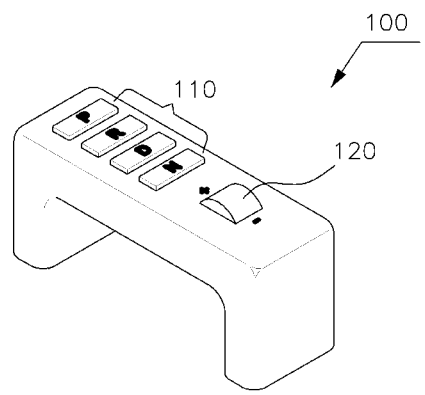
FIGS. 1A to 1D are configuration views of an attachable electronic shift lever according to an exemplary embodiment of the present invention, and moreover.

Hereinafter, an exemplary embodiment of the present invention will be described in detail with reference to the accompanying drawings. It should be understood that terms and words used in the specification and the appended claims are not to be limitedly construed as having common and dictionary meanings, but should be interpreted as meanings and concepts corresponding to the technical spirit of the present invention in view of the principle that the inventor can properly define the concepts of the terms and words in order to describe his/her own invention with the best method. Therefore, the embodiments which are described in the specification and the construction illustrated in the drawings are merely very preferred exemplary embodiments of the present invention and do not represent all the technical spirit of the present invention. It is to be understood that various equivalents and modifications can replace the exemplary embodiments at the time of filing the present application.

The present invention relates to a shift lever structure of a plug in type in which an electronic shift lever (automatic lever) is attachable. In the present invention, a shift lever is attached to a fixing device when a vehicle generally travels, and a driver may easily perform a transmission operation by using a finger while holding on the shift lever with one hand after detaching the shift lever when the driver parks the vehicle while continuously shifting from a R-stage to a D-stage and vice versa or the driver needs to use an H-Matic function when the vehicle travels.

FIGS. 1A to 1D are configuration views of an attachable electronic shift lever according to an exemplary embodiment of the present invention.

An attachable electronic shift lever according to an exemplary embodiment of the present invention may include a PRND button 110 and a scroll wheel 120 operating an H-Matic (+, −) function, which are formed at one region of an upper surface of the electronic shift lever, respectively.

The shift lever 100 is formed to be attachable to and detachable from a fixing device 180 which is formed at one region inside a vehicle, and a lateral side thereof may be formed in a 'C' shape. In addition, the shift lever 100 may be attached to or detached from at least two grooves 170 which are formed at the fixing device 180. Here, the fixing unit 180, which is formed within one region inside the vehicle, may be formed at any region in the vicinity of a driver seat such as a console, and a door operation surface at a side of the driver seat.

As such, as the lateral side of the shift lever 100 is formed in a 'C' shape, the shift lever 100 may be accurately seated in the groove 170 of the fixing device 180, and because a space is formed between the shift lever 100 and the fixing device 180, a driver may easily attach or detach the shift lever 100 while inserting the driver's hand into the space.

Figure 1B:
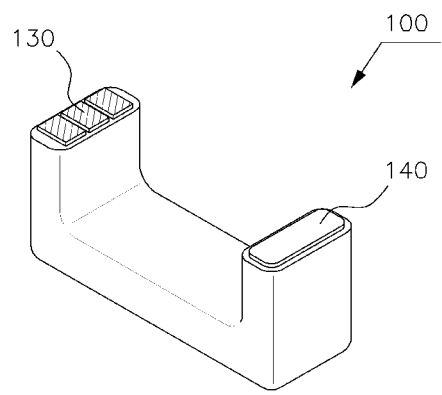
Figure 1C:
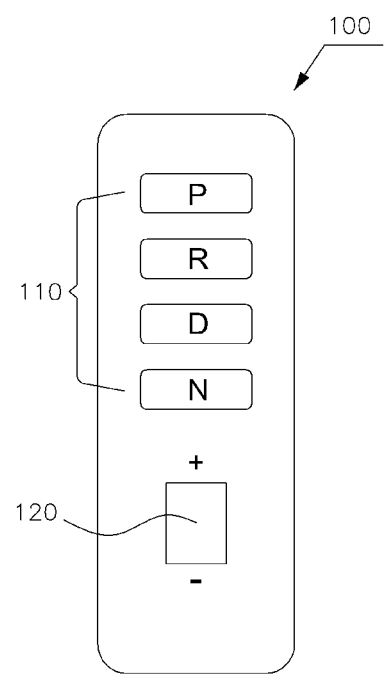

The shift lever 100 may have a charge panel 130 and a steel plate 140 that couples a magnet, which are disposed or formed within one region of a lower surface of the shift lever 100 to be spaced apart from each other. When the shift lever 100 is formed in a 'C' shape, as illustrated in FIG. 1B, the charge panel 130 and the steel plate 140 that couples a magnet may be formed on the lower surface of the shift lever which is divided into both sides, respectively.

In addition, a charge panel 131 for supplying electric power or a magnet 141 may be formed, respectively, in the groove 170 of the fixing device 180, to correspond to the charge panel 130 and the steel plate 140 for coupling the magnet of the shift lever.

Figure 1D:
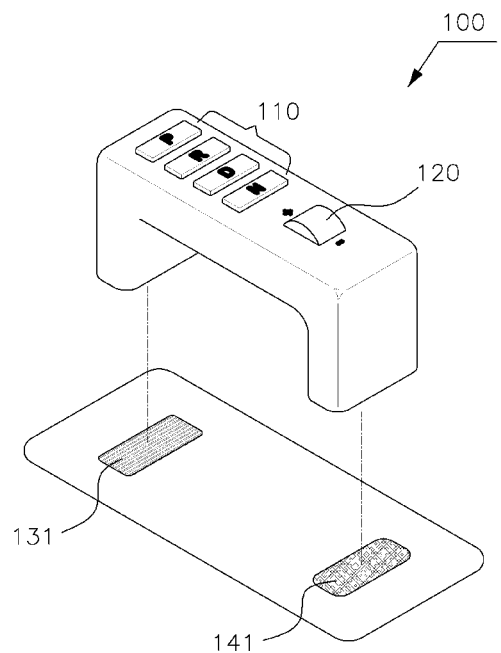

FIG. 1D illustrates the charge panel 130 and the steel plate 140 for coupling the magnet of the shift lever 100, and the charge panel 131 for supplying electric power or the magnet 141 of the fixing device 180 corresponding thereto.

The charge panel 130 of the shift lever, which is in contact with the charge panel 131 for supplying electric power, charges the charger 150 with external electric power, and lighting and touch recognition of the PRND button 110, position recognition of the scroll wheel 120, and a wireless communication device 160, which transmits the above information to a TCU, are operated by using the electric power charged in the charger 150. In addition, even when the shift lever 100 is detached from the fixing device 180, it is possible to perform a transmission mode operation by using the electric power charged in the charger 150.

The charge panel 131 for supplying electric power may be utilized as a charge panel for supplying electric power to various electronic devices such as a cellular phone, a razor, or the like, in addition to supplying the electric power to the shift lever 100. Meanwhile, the steel plate 140 for coupling the magnet of the shift lever and the magnet 141 of the fixing device 180 serve to enable the attachment and detachment of the shift lever 100.

The shift lever 100 may include the wireless communication device 160 inside thereof, the wireless communication device 160 recognizes push/touch of the PRND button 110 and a rotation of the scroll wheel 120 and transmits the recognition result to the TCU (not illustrated) to enable the transmission mode operation.

The push of the PRND button 110 is transmitted to the wireless communication device 160 through a button recognition PCB 111, the rotation of the scroll wheel 120 is transmitted to the wireless communication device 160 through scroll recognition PCB 123, and consequently, the information is transmitted to the TCU.

The PRND button 110 may include an LED in order to improve visibility for the driver, and the scroll wheel 120 may include a position recognition magnet 122 which is connected to an aperture sensor (not illustrated).

A torsion spring 121 is provided at a center shaft of the scroll wheel 120, such that the scroll wheel 120 may be formed to be returned back to its original position after an operator scrolls the scroll wheel 120 forward or backward.

Figure 2A:
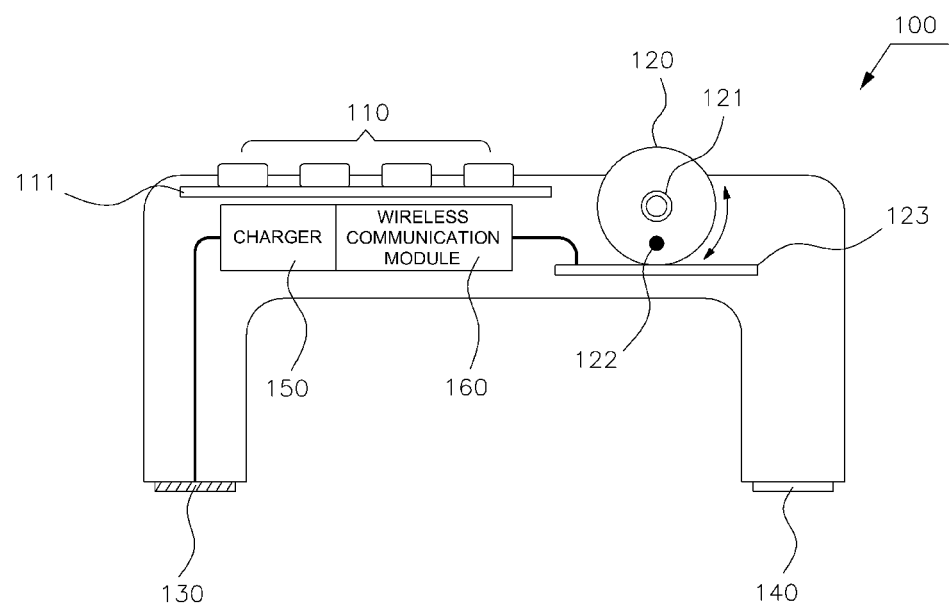
FIGS. 2A to 2B are cross-sectional views of the attachable electronic shift lever according to the exemplary embodiment of the present invention, and moreover.
Figure 2B:
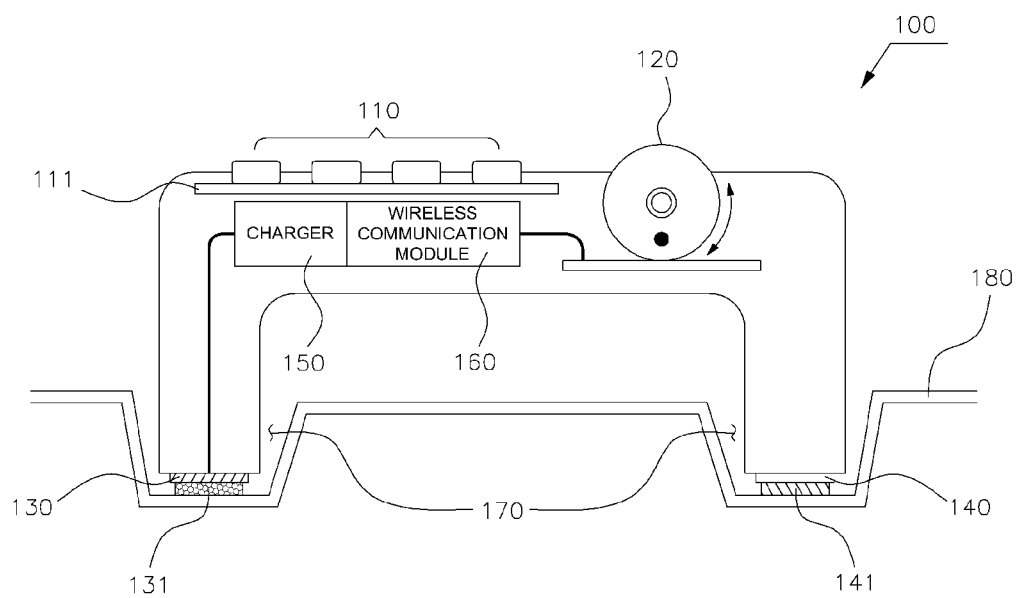

FIGS. 2A to 2B are cross-sectional views of the attachable electronic shift lever according to the exemplary embodiment of the present invention. Referring to FIG. 2B, it may be confirmed that the charge panel 130 and the steel plate 140 for coupling the magnet of the shift lever 100 are coupled to the charge panel 131 for supplying electric power and the magnet 141 which are formed on the groove 170 of the fixing device 180, respectively.

The electric power that is inputted through the charge panel 130 is charged in the charger 150, and used for push/touch recognition of the PRND button 100, the position recognition of the scroll wheel 120, and the information transmission of the wireless communication device 160 to the TCU. That is, the push of the PRND button 110 is transmitted to the wireless communication device 160 through the button recognition PCB 111, the rotation of the scroll wheel 120 is transmitted to the wireless communication device 160 transmitted to the TCU.

The wireless communication device 160 may transmit transmission operation information to the TCU by a CAN (control area network) communication mode, the TCU, which receives the transmission operation information, may change the transmission mode to P, R, N, and D, or the TCU may operate the H-Matic function.

FIGS. 3A-3D is an example view illustrating a state in which the attachable electronic shift lever according to the exemplary embodiment of the present invention is mounted in the vehicle.

Figure 3A:
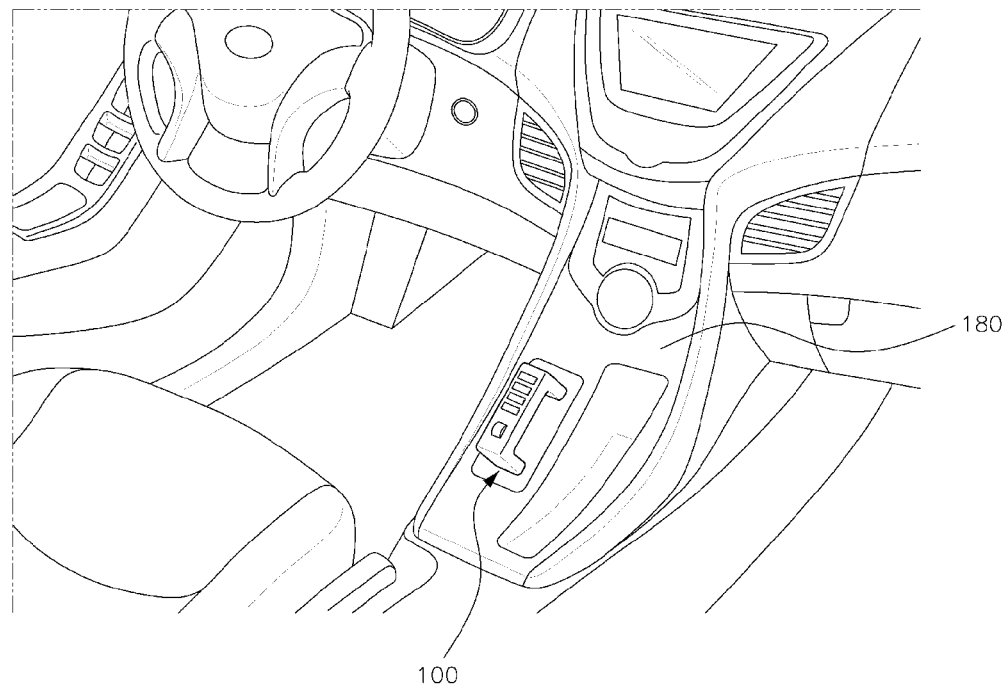
FIGS. 3A-3D is an example view illustrating a state in which the attachable electronic shift lever according to the exemplary embodiment of the present invention is mounted in a vehicle, and moreover.

The shift lever 100 according to the exemplary embodiment of the present invention may be attached to and detached from any portion in one region inside the vehicle by forming the fixing device 180. That is, FIG. 3A illustrates the shift lever 100 attached to a console region of the vehicle, and FIG. 3D illustrates the shift lever 100 formed at a driver seat door. However, when the fixing device 180 is installed at any portion in the vicinity of the driver seat of the vehicle, there is no problem to attach and detach the shift lever 100.

Figure 3B:
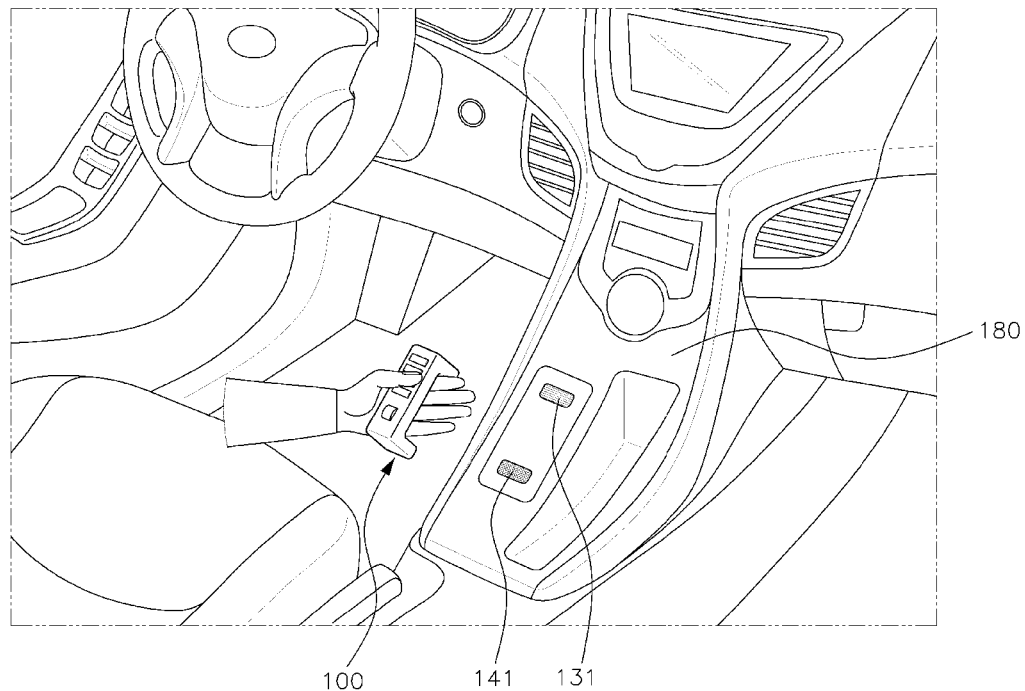
Figure 3C:
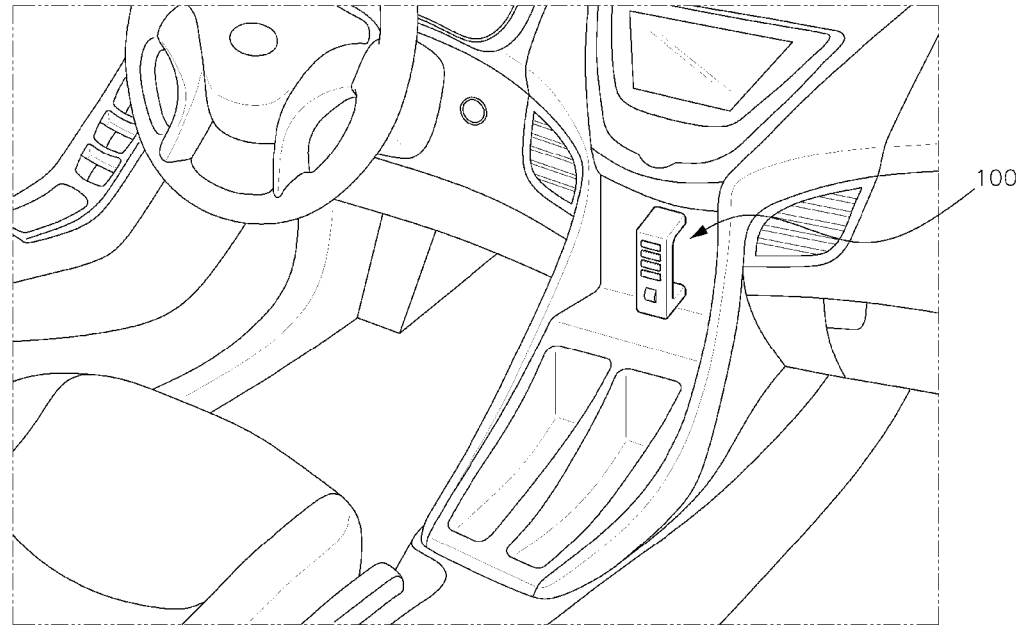
Figure 3D:
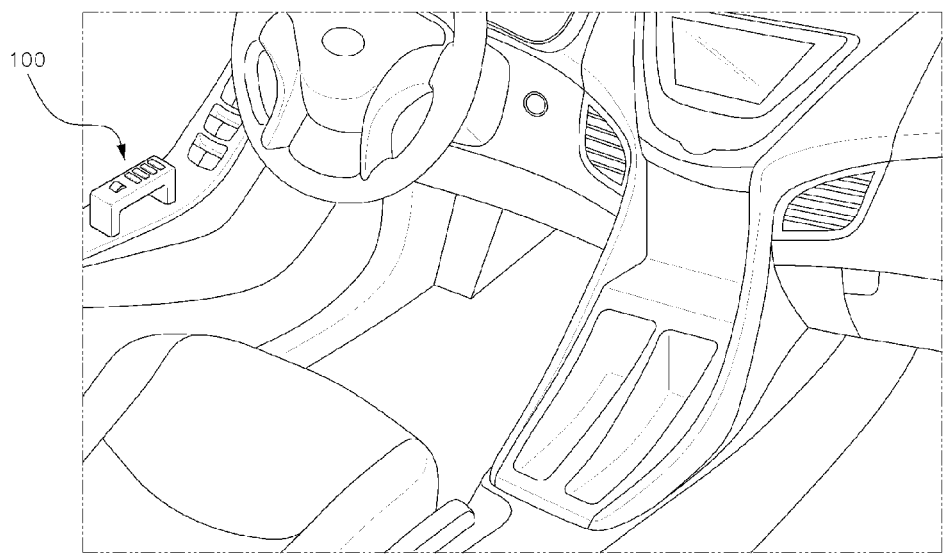

In addition, FIG. 3B illustrates astute in which even when the vehicle travels, the driver detaches the shift lever 100 from the fixing device 180 by using the driver's hand, and then conveniently performs the transmission mode operation by using a finger.

Particularly, when the shift lever 100 is formed in a 'C' shape, the attachment and detachment using the hand becomes more easy, the P, R, N, D transmission mode operation and the H-Matic (+, −) operation through the scroll wheel is possible by only the driver's thumb.

As such, according to the exemplary embodiment of the present invention, because the attachable electronic shift lever is provided, the transmission mode operation may be conveniently performed, visibility for a driver with respect to the transmission mode may be improved, space utilization of a space in the vicinity of the driver seat such as the console may be improved, and a possibility of an injury accident may be reduced at the time of a vehicle collision compared to the protruding type shift lever.

While the present invention has been described in terms of specific embodiments of the present invention, which are merely exemplary embodiments, it should be appreciated that the present invention is not limited to those embodiments. The described embodiments may be changed or altered by the person skilled in the art without departing from the scope of the present invention, and various changes and alterations may be made within the equivalent range of the technical spirit of the present invention and the claims appended below.

What is claimed is:

1. An electronic shift lever, comprising:
a PRND button; and a scroll wheel configured to operate an H-Matic function, which are formed within one region of an upper surface of the shift lever, respectively,
wherein the shift lever is structured to be attachable to and detachable from a fixing device which is formed at one region inside a vehicle,
wherein the shift lever is attachable to and detachable from at least two grooves which is formed within the fixing device,
wherein a charge panel connected to supply electric power or a magnet is formed within each groove of the fixing device,
wherein the shift lever includes a wireless communication device configured to determine whether the PRND button has been pushed and whether the scroll wheel has been rotated and transmit the recognition result to a TCU (transmission control unit).

2. The electronic shift lever of claim 1, wherein a lateral side of the shift lever is formed in a 'C' shape.

3. The electronic shift lever of claim 1, wherein the shift lever has a charge panel and a steel plate coupling a magnet which is formed within one region of a lower surface of the shift lever to be spaced apart from each other accordingly.

4. The electronic shift lever of claim 1, wherein the scroll wheel includes a position recognition magnet connected to an aperture sensor.

5. The electronic shift lever of claim 1, wherein the shift lever includes a charger which is charged by being supplied with external electric power.

* * * * *